US012618598B2

(12) United States Patent
Enoki et al.

(10) Patent No.: US 12,618,598 B2
(45) Date of Patent: May 5, 2026

(54) SNOW ENVIRONMENT TEST APPARATUS AND SNOW ENVIRONMENT TEST METHOD

(71) Applicant: ESPEC CORP., Osaka (JP)

(72) Inventors: Hiroyuki Enoki, Osaka (JP); Haruki Seto, Osaka (JP)

(73) Assignee: ESPEC CORP., Osaka (JP)

( * ) Notice: Subject to any disclaimer, the term of this patent is extended or adjusted under 35 U.S.C. 154(b) by 310 days.

(21) Appl. No.: 18/457,911

(22) Filed: Aug. 29, 2023

(65) Prior Publication Data

US 2024/0068729 A1 Feb. 29, 2024

(30) Foreign Application Priority Data

Aug. 30, 2022 (JP) ................................. 2022-137109

(51) Int. Cl.
*F25C 3/04* (2006.01)
*G01N 1/42* (2006.01)
(52) U.S. Cl.
CPC ................. *F25C 3/04* (2013.01); *G01N 1/42* (2013.01)
(58) Field of Classification Search
CPC ..... F25C 3/04; F25C 2303/0481; G01N 1/42; G01N 33/1873; G01N 17/00; G01N 33/00
See application file for complete search history.

(56) References Cited

U.S. PATENT DOCUMENTS

| | | | |
|---|---|---|---|
| 2005/0120811 A1* | 6/2005 | Hardcastle, III ..... | G01N 17/004 |
| | | | 374/57 |
| 2011/0061477 A1* | 3/2011 | Fitz ...................... | G01N 17/002 |
| | | | 73/865.6 |
| 2017/0227676 A1* | 8/2017 | Archer ................... | G01N 33/24 |

FOREIGN PATENT DOCUMENTS

| | | | | |
|---|---|---|---|---|
| CN | 111579468 A | 8/2020 | | |
| JP | H05-113278 A | 5/1993 | | |
| JP | H06-034244 A | 2/1994 | | |
| JP | H0634244 A | * 2/1994 | ............... F25C 3/04 |
| JP | 2022-052719 A | 4/2022 | | |

OTHER PUBLICATIONS

The extended European search report issued by the European Patent Office on Jan. 23, 2024, which corresponds to European Patent Application No. 23192973.8-1201 and is related to U.S. Appl. No. 18/457,911.
"Notice of Reasons for Refusal" Office Action issued in JP 2022-137109; mailed by the Japanese Patent Office on Feb. 25, 2025.

* cited by examiner

*Primary Examiner* — Francis C Gray
(74) *Attorney, Agent, or Firm* — Studebaker Brackett PLLC

(57) ABSTRACT

A snow environment test apparatus includes a first nozzle that injects water particles, a second nozzle that injects water particles smaller in size than the water particles from the first nozzle, an air conditioner that regulates a temperature in a test chamber to a set temperature, a state selection section that sets a state of snow to be caused to fall, and a flow rate regulation valve that regulates a ratio between quantities of water to be supplied to the first nozzle and to the second nozzle for obtaining the state of the snow set by the state selection section at the set temperature as a temperature at which a snow environment is obtained.

11 Claims, 7 Drawing Sheets

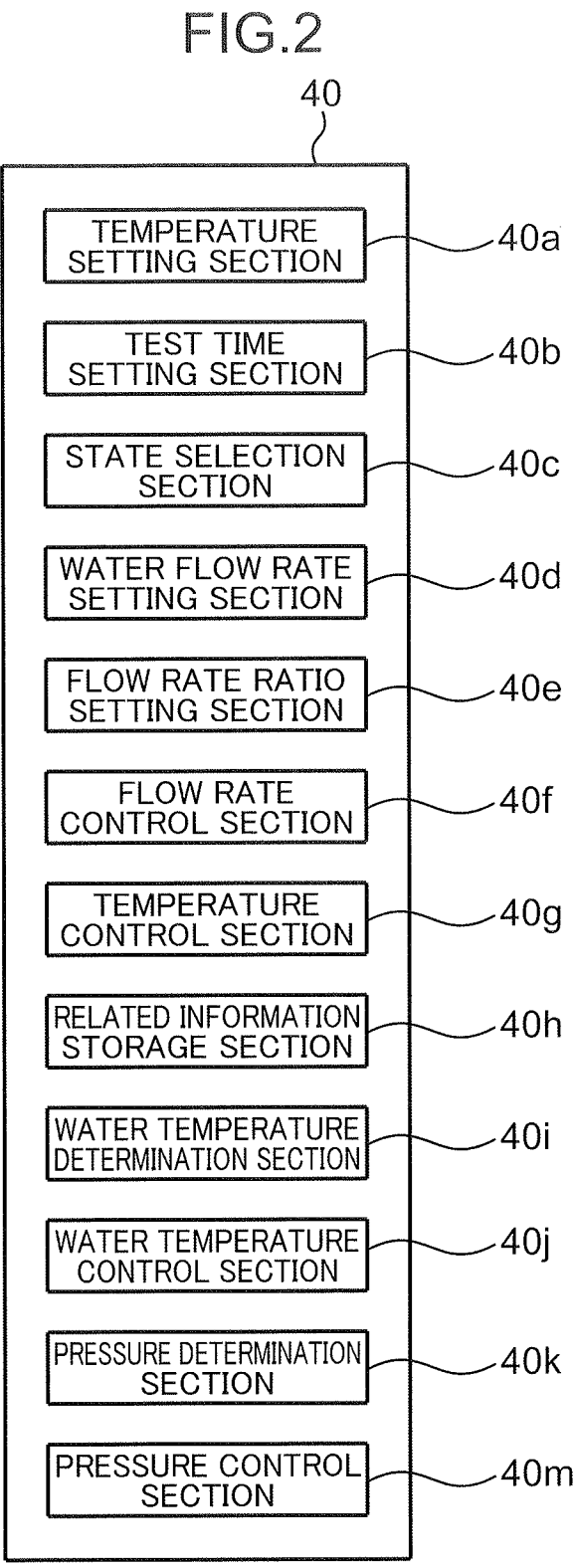

TEMPERATURE
SETTING SECTION — 40a

TEST TIME
SETTING SECTION — 40b

STATE SELECTION
SECTION — 40c

WATER FLOW RATE
SETTING SECTION — 40d

FLOW RATE RATIO
SETTING SECTION — 40e

FLOW RATE
CONTROL SECTION — 40f

TEMPERATURE
CONTROL SECTION — 40g

RELATED INFORMATION
STORAGE SECTION — 40h

WATER TEMPERATURE
DETERMINATION SECTION — 40i

WATER TEMPERATURE
CONTROL SECTION — 40j

PRESSURE DETERMINATION
SECTION — 40k

PRESSURE CONTROL
SECTION — 40m

SNOW ENVIRONMENT TEST APPARATUS AND SNOW ENVIRONMENT TEST METHOD

FIELD OF THE INVENTION

The present invention relates to a snow environment test apparatus and a snow environment test method.

BACKGROUND ART

Conventionally, JP H5-113278 A discloses a known artificial snow making device that reproduces a snow environment in a room. In the artificial snow making device described in JP H5-113278 A, a snowfall phenomenon is reproduced by freezing fine water particles injected from a nozzle.

In the artificial snow making device described in JP H5-113278 A, a snow state is determined depending on a temperature in a room because the size of the fine water particles injected from the nozzle is defined. Therefore, under a predetermined temperature environment, this device can only provide a snow environment where snow is caused to fall depending on this temperature. Thus, this makes it impossible to meet a demand for creating another snow environment different from the above-described environment under this temperature condition. For example, in nature, in a case where the surface of the earth or the vicinity of the surface of the earth is at a certain specific temperature, snow may be formed, or sleet where snow and rain coexist may be formed depending on the temperature in the sky. On the other hand, in the environmental test apparatus, different snow environments are desired to be created under certain specific temperature conditions, but the artificial snow making device described in JP H5-113278 A cannot meet such a demand.

SUMMARY OF THE INVENTION

An object of the present invention is to create not only a snow environment determined depending on a temperature condition but also a snow environment in a desired snow state, in particular, a sleet environment.

A snow environment test apparatus according to one aspect of the present invention that creates a snow environment in a test chamber includes a first nozzle configured to inject water particles, a second nozzle configured to inject water particles smaller in size than the water particles from the first nozzle, an air conditioner for regulating a temperature in the test chamber to a set temperature, a state selection section for setting a state of snow to be caused to fall, and a flow rate regulation section for regulating a ratio between quantities of water to be supplied to the first nozzle and the second nozzle for obtaining the state of the snow set in the state selection section at the set temperature as a temperature at which a snow environment is obtained.

A snow environment test method according to another aspect of the present invention for creating a snow environment in a test chamber includes setting a temperature in the test chamber, setting in a state selection section a state of snow to be caused to fall, setting a ratio between quantities of water to be supplied to a first nozzle and a second nozzle to obtain the state of the snow set at the set temperature as a temperature at which the snow environment is obtained, regulating a temperature in the test chamber to the set temperature by an air conditioner, and supplying water to the first nozzle and the second nozzle at the set ratio and injecting water particles from the first nozzle and from the second nozzle, to create the snow environment, the water particles from the second nozzle being smaller in size than the water particles from the first nozzle.

BRIEF DESCRIPTION OF THE DRAWINGS

FIG. 2 is a diagram for describing a function of a controller.

DESCRIPTION OF EMBODIMENTS

Preferred embodiments of the present invention will be described in detail below with reference to the drawings.

Figure 1:
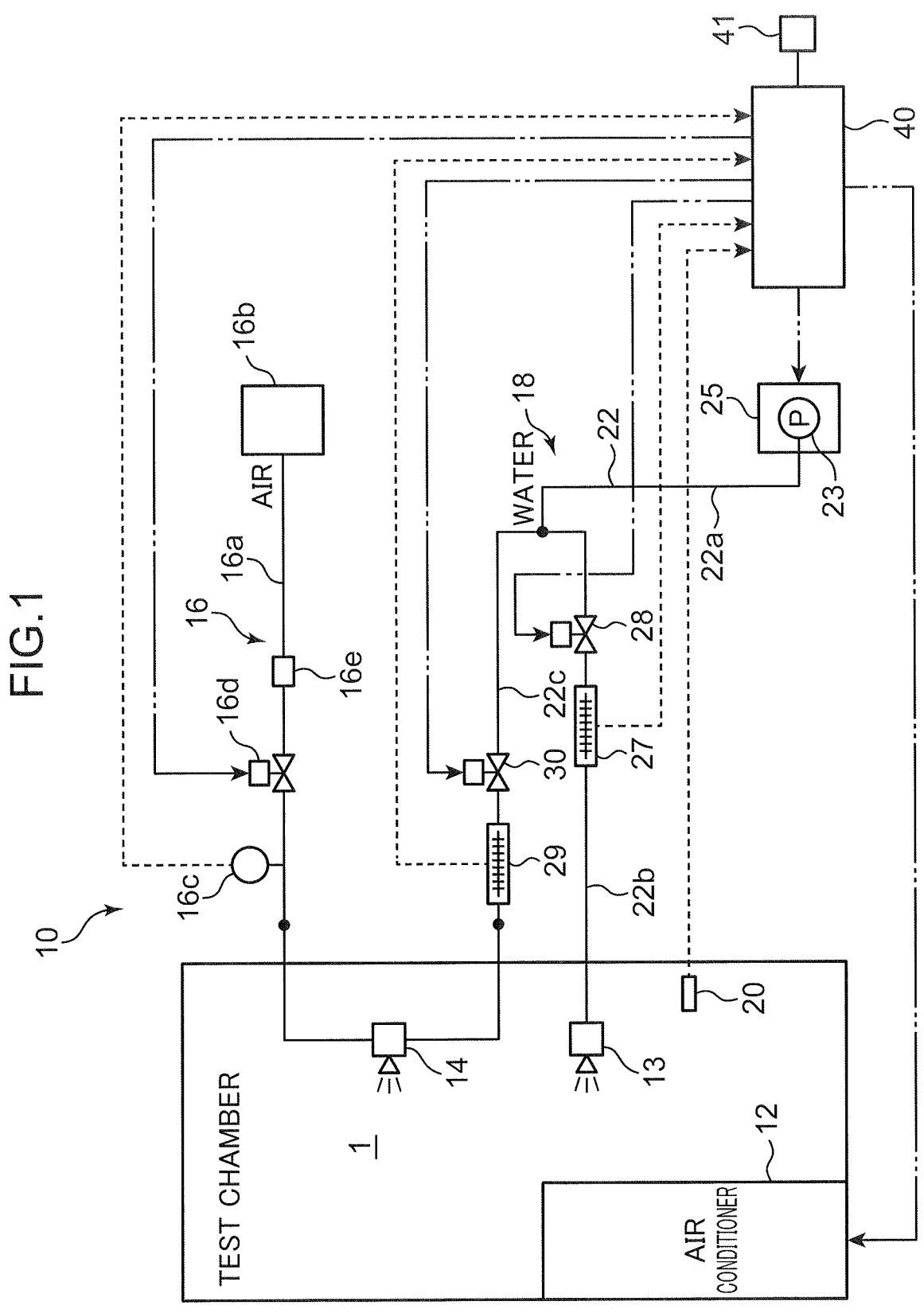
FIG. 1 is a diagram schematically illustrating a snow environment test apparatus according to an embodiment.

As illustrated in FIG. 1, a snow environment test apparatus 10 according to the present embodiment is an apparatus that creates a snow environment in a desired snow state in a test chamber 1 and performs a test for exposing a specimen placed in the test chamber 1 to the snow environment. Here, the snow state means a property of snow or the like indicating whether the snow is any one of snow or sleet. That is, the snow environment test apparatus 10 according to the present embodiment can create not only a snow environment where snow is caused to fall but also a snow environment where sleet including both snow and rain is caused to fall. Furthermore, the snow environment test apparatus 10 of the present embodiment is configured to be able to create not only these snow environments but also a rain environment where rain is caused to fall.

The snow environment test apparatus 10 includes an air conditioner 12 configured to cool the inside of the test chamber 1, a first nozzle (spray nozzle) 13, a second nozzle (spray nozzle) 14 that injects water particles (very fine droplets) having a smaller size than the water particles (very fine droplets) from the first nozzle 13, an air supply section 16 that supplies air to the second nozzle 14, and a water supply section 18 that supplies water to the first nozzle 13 and the second nozzle 14.

The air conditioner 12 is configured to generate low-temperature air to be able to cool the air in the test chamber 1. The inside of the test chamber 1 is regulated to a predetermined temperature for example such as at least less than 0° C. or the like by controlling the air conditioner 12. That is, the air conditioner 12 regulates the temperature of the air in the test chamber 1 so that the fine water particles injected from the second nozzle 14 is caused to freeze. The air conditioner 12 can regulate the temperature in the test chamber 1 to a range between, for example, 0° C. and −30°

C. Note that when a rain environment is created, the air conditioner 12 may regulate the temperature in the test chamber 1 to 0° C. or higher, for example, a temperature of between 0° C. and 20° C.

The temperature in the test chamber 1 is detected by a room temperature sensor 20.

The first nozzle 13 is configured by a single-fluid nozzle (spray nozzle), and is configured to make fine water particles (very fine droplets) from water supplied from the water supply section 18 to inject the water particles. The water particles to be injected from the first nozzle 13 is larger in size than the water particles to be injected from the second nozzle 14. The water particles from the first nozzle 13 has a size not frozen or hardly frozen in the temperature in the test chamber 1.

The second nozzle 14 is configured by a two-fluid nozzle (spray nozzle), and is configured to be able to inject a fluid in a state where fine water particles (very fine droplets) and air are mixed. That is, the second nozzle 14 injects water supplied from the water supply section 18 and air supplied from the air supply section 16 together while dispersing the water. At this time, since the injected water is pulverized by the injected air, the fine water particles and the air are injected from the second nozzle 14. The water particles to be injected from the second nozzle 14 is smaller in size than the water particles to be injected from the first nozzle 13.

The air supply section 16 includes an air pipe 16a connected to the second nozzle 14, and a compressor 16b that causes air to flow towards the second nozzle 14 in the air pipe 16a. The air pipe 16a is provided with a pressure sensor 16c for detecting the pressure of the air flowing through the air pipe 16a, and a pressure regulation valve 16d for regulating the pressure of the air flowing through the air pipe 16a. The pressure of air introduced into the second nozzle 14 is regulated by the pressure regulation valve 16d regulating the pressure of the air flowing through the air pipe 16a. Note that if the pressure of air to be supplied is stable, the pressure sensor 16c and the pressure regulation valve 16d can be omitted.

Further, the air pipe 16a includes a heating and cooling unit 16e (temperature regulator) for heating or cooling the air flowing through the air pipe 16a. The heating and cooling unit 16e may be driven to keep the temperature of the air to be supplied to the second nozzle 14 constant. In this case, the degree to which the water particles from the second nozzle 14 turn into snow can be suppressed to vary depending on the temperature change of the air to be supplied to the second nozzle 14. Note that the heating and cooling unit 16e can be omitted.

The water supply section 18 includes a water pipe 22 and a pump 23 that allows water to flow in the water pipe 22. The water pipe 22 includes a main pipe 22a connected to the pump 23, a first branch pipe 22b connected to the main pipe 22a and to the first nozzle 13, and a second branch pipe 22c connected to the main pipe 22a and to the second nozzle 14.

The main pipe 22a of the water pipe 22 is provided with a heating and cooling unit 25. The water cooled by the heating and cooling unit 25 (water temperature regulator) to a predetermined temperature is introduced into the first nozzle 13 and the second nozzle 14 through the water pipe 22. The first branch pipe 22b of the water pipe 22 is provided with a flowmeter (first flowmeter 27) for detecting the flow rate of water flowing through the first branch pipe 22b, and a flow rate regulation valve (first flow rate regulation valve 28) for regulating the flow rate of water flowing through the first branch pipe 22b. Further, the second branch pipe 22c of the water pipe 22 is provided with a flowmeter (second flowmeter 29) for detecting the flow rate of water flowing through the second branch pipe 22c, and a flow rate regulation valve (second flow rate regulation valve 30) for regulating the flow rate of water flowing through the second branch pipe 22c. Note that if the temperature of water to be supplied is stable, the heating and cooling unit 25 can be omitted. The heating and cooling unit 25 may be configured such that its output is not controlled by a controller 40 but is independently controlled, or constant output is provided.

The room temperature sensor 20, the pressure sensor 16c, the pressure regulation valve 16d, the heating and cooling unit 25, the first flowmeter 27, the first flow rate regulation valve 28, the second flowmeter 29, and the second flow rate regulation valve 30 are electrically communicably connected to the controller 40. The controller 40 is a computer that controls various operations of the snow environment test apparatus 10, and includes a microcomputer or the like that has a central processing unit (CPU) that executes arithmetic processing, a read only memory (ROM) that stores a processing program, data, and the like, and a random access memory (RAM) that temporarily stores data, and the like. An input device 41 is connected to the controller 40. When the processing program stored in the controller 40 is executed, as illustrated in FIG. 2, the controller 40 can function as a temperature setting section 40a, a test time setting section 40b, a state selection section 40c, a water flow rate setting section 40d, a flow rate ratio setting section 40e, a flow rate control section 40f, a temperature control section 40g, a related information storage section 40h, a water temperature determination section 40i, a water temperature control section 40j, a pressure determination section 40k, and a pressure control section 40m.

The temperature setting section 40a is a functional unit for setting the temperature (test temperature) in the test chamber 1. For example, when a tester inputs a temperature with the input device 41, information indicating the input temperature is stored in the controller 40.

The test time setting section 40b is a functional unit for setting a test time during which the created snow environment is continued. For example, when the tester inputs the test time with the input device 41, information indicating the input test time is stored in the controller 40.

The state selection section 40c is a functional unit for setting a snow state (or a rain state), and is configured to be able to selectively store information indicating any one of snow, sleet, and rain. The state selection section 40c may set the degree of sleet, that is, the ratio between rain and snow as the snow state. Snow, sleet, and rain can be selected with the input device 41. When the tester selects snow, sleet, or rain with the input device 41, the state selection section 40c stores information indicating the selected snow, sleet, or rain. In addition, the state selection section 40c may set the quality of snow. In this case, the state selection section 40c may be configured to be able to also set dry snow and wet snow, or set a ratio between rain and snow. When dry snow is selected from, for example, dry snow and wet snow with the input device 41 in a case where dry snow and wet snow are selectable, information indicating that dry snow has been selected is stored in the state selection section 40c.

Although the state selection section 40c may be configured to be able to set only any one of snow, sleet, and rain, in the present embodiment, a plurality of them can be set. That is, in a case where a plurality of types of snow, sleet, and rain is set, a test can be performed in a manner that any set snow environment (or rain environment) is created and then changed to another set snow environment (or rain environment). For example, snow can be set for a first test, and sleet can be set for a second test. In this case, the snow environment test apparatus 10 first causes snow to fall for a predetermined time, and then causes sleet to fall for a predetermined time.

Note that the snow states as prepared options are not limited to snow, sleet, and rain, and for example, a snow and sleet state may be prepared as an option. In this case, rain may not be prepared as an option. In addition, dry snow and wet snow may be prepared as options instead of snow.

The temperature control section 40g is configured to cause the air conditioner 12 to make the temperature detected by the room temperature sensor 20 be the temperature set by the temperature setting section 40a.

The water flow rate setting section 40d is a functional unit for setting the total flow rate of water to be supplied to the first nozzle 13 and the second nozzle 14. For example, when the tester inputs the flow rate of the water with the input device 41, information indicating the input water flow rate is stored in the controller 40.

The flow rate ratio setting section 40e is a functional unit for setting a flow rate ratio between water to be supplied to the first nozzle 13 and water to be supplied to the second nozzle 14, and is configured to set the flow rate ratio based on the snow state set in the state selection section 40c. For example, in a case where the sleet is set in the state selection section 40c, the flow rate ratio is set such that the water flow rate ratio between the first nozzle 13 and the second nozzle 14 becomes 50% to 50%. In this case, a valve control is performed by the flow rate control section 40f such that water of 50% of the total flow rate set by the water flow rate setting section 40d is supplied to the first nozzle 13, and water of remaining 50% is supplied to the second nozzle 14.

Further, in a case where the degree of sleet is set by the state selection section 40c, the flow rate ratio setting section 40e sets the flow rate ratio between the nozzles 13 and 14 based on the degree. For example, in a case where rain is set to 30% and snow is set to 70% as the degree of sleet in the state selection section 40c based on the input by the tester, the flow rate ratio setting section 40e sets the flow rate ratio such that the water flow rate ratio between the first nozzle 13 and the second nozzle 14 becomes 30% to 70%. Further, in a case where rain is selected, the ratio between the first nozzle 13 and the second nozzle 14 is set to 100% to 0%, and in a case where snow is selected, the ratio is set to 0% to 100%.

Note that in a case where wet snow and dry snow are selectable, wet snow and dry snow may be separately created by regulating the temperature of water to be supplied by the water supply section 18, by regulating the temperature in the test chamber 1, by regulating the pressure of air to be supplied by the air supply section 16, or by regulating the temperature of the air to be supplied by the air supply section 16. For example, in a case where dry snow is selected, a water temperature may be set to a certain temperature by a water temperature determination section 40i described later, and in a case where wet snow is selected, the water temperature may be set to a temperature higher than the certain temperature. Further, in the case where dry snow is selected, an air pressure may be set to a certain pressure by the pressure determination section 40k described later, and in the case where wet snow is selected, the air pressure may be set to a pressure lower than the certain pressure. Further, in the case where dry snow is selected, an air temperature may be set to a certain temperature, and in the case where wet snow is selected, the air temperature may be set to a temperature higher than the certain temperature.

The flow rate control section 40f is configured to control the first flow rate regulation valve 28 of the first branch pipe 22b and the second flow rate regulation valve 30 of the second branch pipe 22c based on the flow rate ratio between water to be supplied to the first nozzle 13 and water to be supplied to the second nozzle 14, the supply flow rate ratio being set by the flow rate ratio setting section 40e. That is, the flow rate control section 40f, the first flow rate regulation valve 28, and the second flow rate regulation valve 30 function as a flow rate regulation section that regulates the ratio between the quantities of water to be supplied to the first nozzle 13 and the second nozzle 14.

For example, in a case where water particles injected from the second nozzle 14 turn into snow at a certain test temperature, sleet can be formed or a desired degree of sleet can be formed only by changing the water flow rate ratio between the first nozzle 13 and the second nozzle 14. That is, the flow rate ratio setting section 40e may be configured to regulate the flow rate ratio between the first nozzle 13 and the second nozzle 14 based on the snow state obtained by the water particles injected from the second nozzle 14.

The related information storage section 40h is a functional unit that stores information in which the temperature in the test chamber 1, the flow rate of water to be supplied to the second nozzle 14, and information about the state of water particles injected from the second nozzle 14 (information indicating whether the water particles injected from the second nozzle 14 turn into snow, sleet or rain) are related with each other. Further, the related information storage section 40h may store information in which the temperature in the test chamber 1, the flow rate of water to be supplied to the first nozzle 13, and information about the state of water particles injected from the first nozzle 13 (information indicating whether the water particles injected from the first nozzle 13 turn into snow, sleet, or rain) are related with each other. Note that the information about the state of the water particles injected from the second nozzle 14 is not limited to the information indicating any of snow, sleet, and rain, and may be, for example, information indicating what proportion of the water particles turn into snow. Further, the information about the state of the water particles injected from the first nozzle 13 is also not limited to the information indicating any of snow, sleet, and rain, and may be, for example, information indicating what proportion of the water particles turn into snow.

Figure 3:
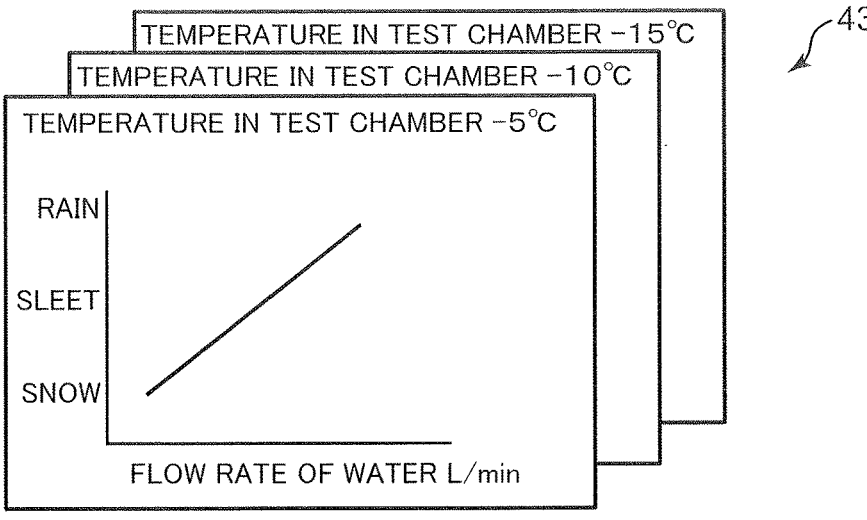
FIG. 3 is a diagram for describing information stored in a related information storage section.

As illustrated in FIG. 3, the related information storage section 40h may include for example a map 43 having information in which the test temperature (the temperature in the test chamber 1), the flow rate of water to be supplied to the second nozzle 14, and the information about the state of water particles injected from the second nozzle 14 (information indicating whether the water particles from the second nozzle 14 turn into snow, sleet, or rain) are related with each other. Further, the related information storage section 40h may include a map (not illustrated, but similar to the map 43 of FIG. 3) having information in which the temperature in the test chamber 1, the flow rate of water to be supplied to the first nozzle 13, and the information about the state of the water particles injected from the first nozzle 13 (information indicating whether the water particles from the first nozzle 13 turn into snow, sleet, or rain) are related with each other. This map is configured in a similar manner to the map 43 of FIG. 3. Note that, in the related information storage section 40h, the information in which the temperature in the test chamber 1, the flow rate of water to be supplied to the first nozzle 13, and the information about the state of water particles injected from the first nozzle 13 are related with each other may be omitted.

Figure 4:
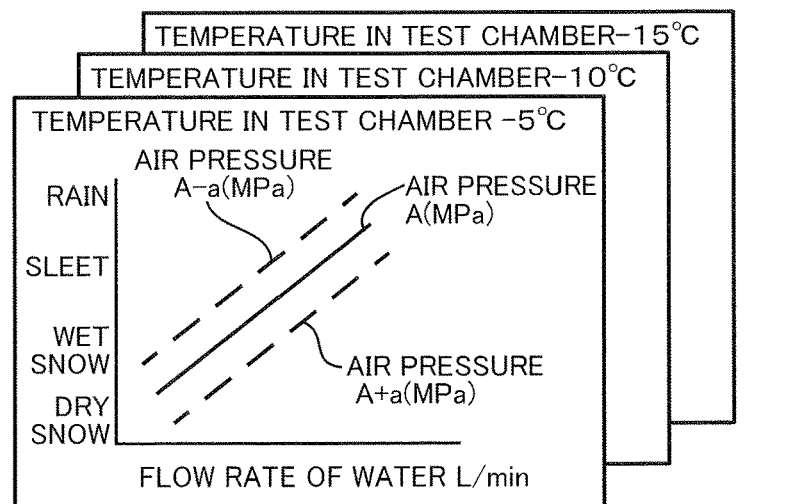
FIG. 4 is a diagram for describing information stored in a related information storage section according to a modification.

In the case where wet snow and dry snow are configured to be selectable, the related information storage section 40*h* may store information in which the temperature in the test chamber 1, the flow rate of water to be supplied to the second nozzle 14, a pressure of air to be supplied to the second nozzle 14, and information about the state of water particles injected from the second nozzle 14 (information indicating whether the water particles injected from the second nozzle 14 turn into dry snow, wet snow, sleet, or rain) are related with each other. In this case, as illustrated in FIG. 4, the related information storage section 40*h* may include the map 43 having information in which the test temperature (the temperature in the test chamber 1), the flow rate of water to be supplied to the second nozzle 14, and the pressure of air to be supplied to the second nozzle 14, and the information about the state of water particles injected from the second nozzle 14 (information indicating whether the water particles injected from the second nozzle 14 turn into dry snow, wet snow, sleet, or rain) are related with each other. Further, also in a case where the wet snow and dry snow are selectable, the related information storage section 40*h* may store information in which the temperature in the test chamber 1, the flow rate of water to be supplied to the first nozzle 13, and information about the state of water particles injected from the first nozzle 13 (information indicating any one of rain, sleet, and snow) are related with each other.

Figure 5:
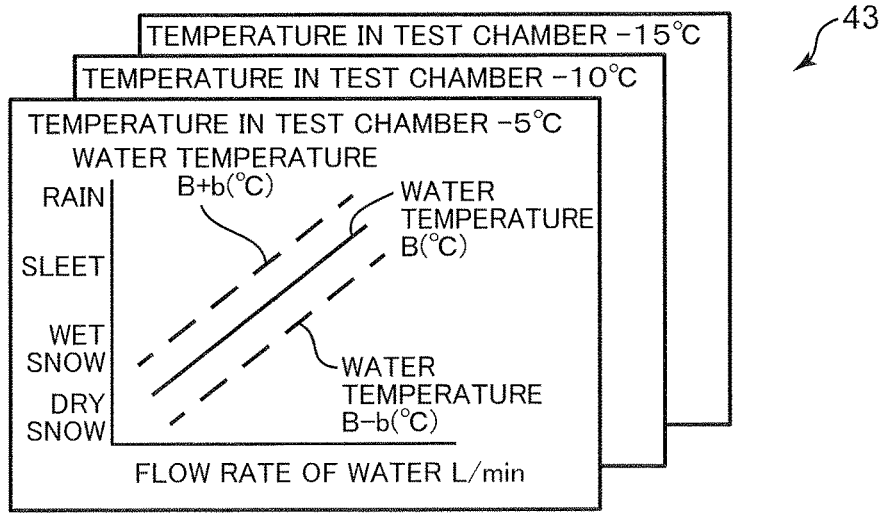
FIG. 5 is a diagram for describing information stored in a related information storage section according to a modification.

Further, also in the case where wet snow and dry snow are selectable, the related information storage section 40*h* may store information in which the temperature in the test chamber 1, the flow rate of water to be supplied to the second nozzle 14, the temperature of water to be supplied to the second nozzle 14, and information about the state of water particles injected from the second nozzle 14 (information indicating whether the water particles injected from the second nozzle 14 turn into dry snow, wet snow, sleet, or rain) are related with each other. In this case, for example as illustrated in FIG. 5, the related information storage section 40*h* may include the map 43 having information in which the test temperature (the temperature in the test chamber 1), the flow rate of water to be supplied to the second nozzle 14, and the temperature of water to be supplied to the second nozzle 14, and the information about the state of water particles injected from the second nozzle 14 (information indicating whether the water particles injected from the second nozzle 14 turn into dry snow, wet snow, sleet, or rain) are related with each other. Further, also in this case, the related information storage section 40*h* may store information in which the temperature in the test chamber 1, the flow rate of water to be supplied to the first nozzle 13, and the state of water particles injected from the first nozzle 13 (any one of rain, sleet, and snow) are related with each other.

Use of the information stored in the related information storage section 40*h* makes it possible to derive which snow state can be obtained at each test temperature in a case of a certain water flow rate (what percent of water is supplied to the second nozzle 14 among the total flow rate of water). In addition, in a case where a certain snow state is desired to be obtained at each test temperature, it is possible to derive how many liters of water to be supplied to the second nozzle 14 per minute as the water flow rate. The information stored in the related information storage section 40*h* can be acquired by a preliminary test to cause snow to fall in the test chamber 1 after regulating the temperature in the test chamber, the flow rate of water, the water temperature, and the air pressure and then to check the snow state.

Note that although snow, sleet, and rain are stored as the snow states (or the rain state) stored in the state selection section 40*c*, the degree of sleet (ratio between rain and snow) may be stored instead of or together with the snow, sleet, and rain. Dry snow and wet snow may be stored as the quality of snow to be stored in the state selection section 40*c*. The information stored in the related information storage section 40*h* may be information expressed by a relational expression, information in the form of a list, or the like. The number of the prepared test temperatures is not limited to three, and information in the case of more test temperatures may be prepared. In addition, the information stored in the related information storage section 40*h* includes the flow rate of water to be supplied to the second nozzle 14, but instead of this, may include the total flow rate of water to be supplied to the first nozzle 13 and the second nozzle 14. That is, since the flow rate ratio setting section 40*e* determines the flow rate ratio between water to be supplied to the first nozzle 13 and the second nozzle 14 based on the snow state, the flow rate of water to be supplied to the second nozzle 14 can be derived from the total water flow rate included in the information stored in the related information storage section 40*h*.

The water temperature determination section 40*i* is a functional unit for determining the temperature of water to be supplied by the water supply section 18, and is configured to determine the temperature of the water with reference to the temperature in the test chamber 1 set in the temperature setting section 40*a*, the water flow rate set in the water flow rate setting section 40*d*, the quality of snow (dry snow and wet snow) set in the state selection section 40*c*, and the information stored in the related information storage section 40*h*.

The water temperature control section 40*j* is configured to cause the heating and cooling unit 25 to make the temperature of water to be supplied by the water supply section 18 becomes the water temperature determined by the water temperature determination section 40*i*. Note that in a case where the snow quality (dry snow and wet snow) cannot be selectable, the water temperature determination section 40*i* and the water temperature control section 40*j* can be omitted.

The pressure determination section 40*k* is configured to determine the pressure of air to be supplied to the second nozzle 14 using the temperature in the test chamber 1 set in the temperature setting section 40*a*, the water flow rate set in the water flow rate setting section 40*d*, the water temperature determined by the water temperature determination section 40*i*, the snow quality set in the state selection section 40*c*, and the information stored in the related information storage section 40*h*.

The pressure control section 40*m* is configured to control the pressure regulation valve 16*d* so that the pressure of air to be supplied to the second nozzle 14 becomes the pressure determined by the pressure determination section 40*k*. That is, the pressure determination section 40*k*, the pressure control section 40*m*, and the pressure regulation valve 16*d* function as a pressure regulation section for regulating the pressure of air to be supplied to the second nozzle 14 to the pressure obtained by using the information stored in the related information storage section 40*h*. Regulation of the pressure of the air to be supplied to the second nozzle 14 enables the quality of snow to be changed from wet snow to dry snow, for example. That is, when the pressure of air to be supplied to the second nozzle 14 increases, the size of the injected water particles becomes smaller, and thus the snow quality can be changed from wet snow to dry snow. Further, the regulation of the pressure of the air to be supplied to the second nozzle 14 also enables the water particles from the second nozzle 14 not to be partially frozen, and thus enables a change from snow to sleet. Note that in a case where the snow quality (dry snow and wet snow) is not selectable, the pressure determination section 40k and the pressure control section 40m can be omitted.

Here, a method for performing a snow environment test using the snow environment test apparatus 10 will be described with reference to FIG. 6. Note that, here, as an example of the test method, an example will be described in which the test is performed in the order of rainfall (the first test), sleet (the second test), and wet snow (the third test), and the degree of sleet (ratio between rain and snow) is not set, as illustrated in FIG. 7.

With the snow environment test method, first, the tester places a specimen in the test chamber 1, and then inputs the temperature in the test chamber 1 with the input device 41 and inputs the test time with the input device 41. At this time, tester inputs the test chamber temperature and the test time for each of the first test, the second test, and the third test. As a result, the test chamber temperature is set in the temperature setting section 40a, and the test time is set in the test time setting section 40b (steps ST11 and ST12).

Further, the tester inputs the flow rate of water to be supplied by the water supply section 18 with the input device 41. As a result, the flow rate of water is set in the water flow rate setting section 40d (step ST13). In addition, the tester selects a snow state with the input device 41. At this time, for example, rain is selected for the first test, sleet is selected for the second test, and wet snow is selected for the third test. As a result, the snow states are set in the state selection section 40c (step ST14). The flow rate of water may be constant in the first to third tests, or may be set for each of the first test, the second test, and the third test. The test temperature may be gradually reduced in the second test, but may be maintained at a constant temperature also in the second test.

Since rain is selected for the first test, the flow rate ratio between the water to be supplied to the first nozzle 13 and the water to be supplied to the second nozzle 14 is set to 100% to 0% by the flow rate ratio setting section 40e. Since sleet is selected for the second test, the flow rate ratio is set to 50% to 50% by the flow rate ratio setting section 40e. Since wet snow (snow) is selected for the third test, the flow rate ratio is set to 0% to 100% by the flow rate ratio setting section 40e (step ST15).

Subsequently, the air conditioner 12 is operated, and the temperature control section 40g causes the air conditioner 12 to make the temperature in the test chamber 1 detected by the room temperature sensor 20 be the temperature set by the temperature setting section 40a (step ST16). Then, when the temperature in the test chamber 1 reaches the set temperature, the test is started (step ST17). Thus, the test time is measured.

First, in order to start with the first test, the air conditioner 12 controls the temperature in the test chamber 1 to be the temperature set as the temperature for the first test. The flow rate control section 40f controls the first flow rate regulation valve 28 and the second flow rate regulation valve 30 based on the flow rate ratio of water to be supplied to the first nozzle 13 and the second nozzle 14, the flow rate ratio being set by the flow rate ratio setting section 40e (step ST18). At this time, since rain is selected for the first test, the second flow rate regulation valve 30 of the water supply section 18 and the pressure regulation valve 16d of the air supply section 16 are closed. Therefore, the water supply section 18 does not supply water to the second nozzle 14, but supplies water to the first nozzle 13 through the first branch pipe 22b of the water pipe 22. As a result, water droplets can be injected from the first nozzle 13 to cause rain to fall. At this time, since the pressure regulation valve 16d is closed, the air supply section 16 does not supply air to the second nozzle 14.

In this state, when the set test time has elapsed, the processing proceeds to the second test (step ST19). In the second test, the air conditioner 12 controls the test chamber temperature to be the temperature set for the second test. Further, in the second test, since the sleet is selected, the flow rate ratio between the first nozzle 13 and the second nozzle 14 is set to 50% to 50%. As a result, the flow rate of water to be supplied to the second nozzle 14 is set depending on the water flow rate set by the water flow rate setting section 40d and the set flow rate ratio. And the flow rate control section 40f controls the first flow rate regulation valve 28 and the second flow rate regulation valve 30 (step ST20). That is, the flow rate ratio between water to be supplied to the first nozzle 13 and water to be supplied to the second nozzle 14 is regulated while the total flow rate of water to be supplied to the first nozzle 13 and the second nozzle 14 is kept constant. At this time, the controller 40 determines whether the water particles injected from the second nozzle 14 turn into snow or sleet, based on the information stored in the related information storage section 40h, the set test temperature, and the flow rate of water to the second nozzle 14. In a case where the determination is made that the water particles from the second nozzle 14 turn into snow or sleet and the water particles from the first nozzle 13 and the water particles from the second nozzle 14 turn into sleet, the set flow rate of water is adopted as it is. On the other hand, in a case where a determination is made that sleet is not obtained, the controller 40 derives a water flow rate at which the water particles from the second nozzle 14 turn into snow or sleet. Then, the flow rate control section 40f controls the first flow rate regulation valve 28 and the second flow rate regulation valve 30 depending on the derived water flow rate (step ST20). This provides the snow environment where sleet is caused to fall. Then, the sleet test is continued for the set test time.

In this state, when the set test time has elapsed, the processing proceeds to the third test (step ST21). In the third test, the air conditioner 12 controls the test chamber temperature to be the temperature set for the third test. Further, in the third test, since wet snow is selected, the flow rate ratio between the first nozzle 13 and the second nozzle 14 is set to 0% to 100%. As a result, the flow rate of water to be supplied to the second nozzle 14 is set depending on the set flow rate ratio, and the first flow rate regulation valve 28 and the second flow rate regulation valve 30 are controlled to provide the set flow rate of water (step ST22).

In the third test, the temperature of water to be supplied by the water supply section 18 is set to the temperature determined by the water temperature determination section 40i (step ST23). Further, the pressure of air to be supplied to the second nozzle 14 is derived by the pressure determination section 40k by using the information stored in the related information storage section 40h (step ST24). The pressure control section 40m controls the pressure regulation valve 16d to make the air pressure be the air pressure derived by the pressure determination section 40k (step ST25). This provides a snow environment where wet snow is caused to fall. Then, when the set time elapses, the third test ends.

Note that in the third test, only one of step ST23 of setting the water temperature and step ST25 of regulating the air pressure may be performed. In the third test, in a case where snow is simply selected without setting snow quality, steps ST23 to ST25 can be omitted.

Figure 6:
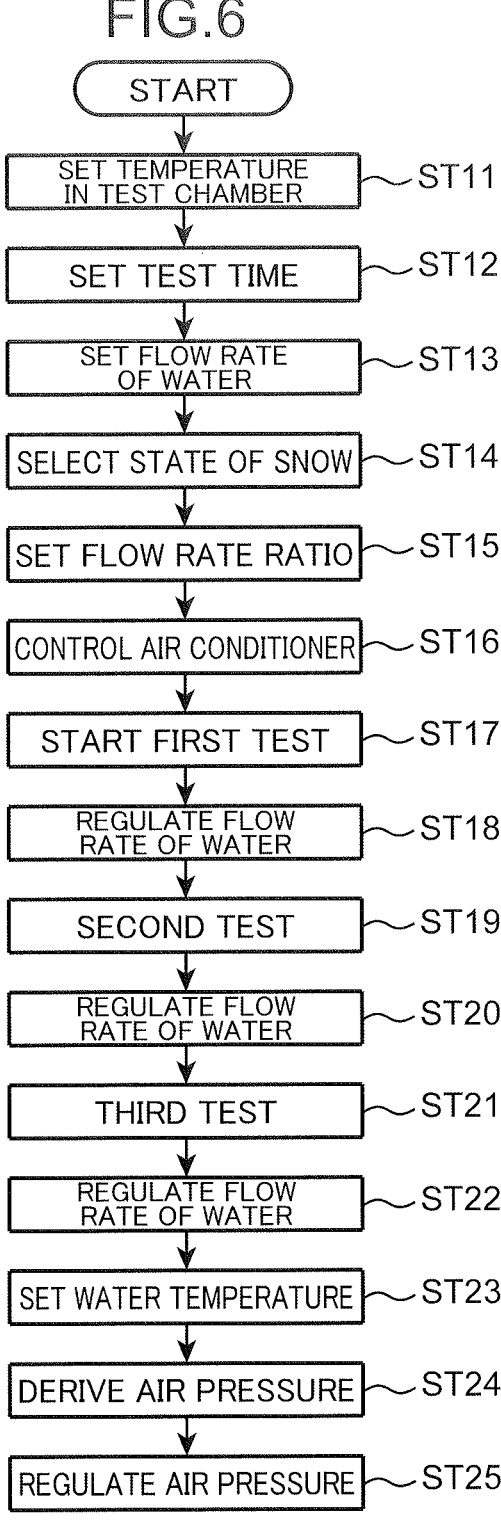
FIG. 6 is a diagram for describing a snow environment test method according to the embodiment.
Figure 7:
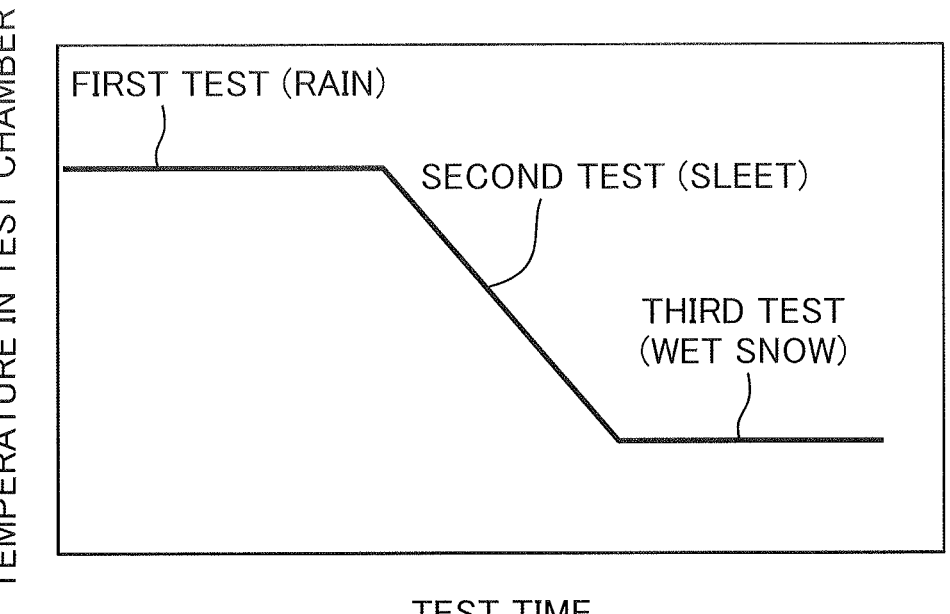
FIG. 7 is a diagram for describing an example of the snow environment test method according to the embodiment.

The snow environment test method described with reference to FIG. 6 is a method for a case where the degree of sleet is not regulated in the second test, but the degree of sleet may be regulated. For example, even in a case where a predetermined degree of sleet (the water to snow ratio is 50% to 50%) is desired to be obtained, the degree of sleet may change depending on the test chamber temperature or the temperature of water to be supplied by the water supply section 18. This makes it difficult to obtain a predetermined degree of sleet. That is, when the temperature is a first temperature (for example, the test chamber temperature is −15° C.), all of water particles injected from the second nozzle 14 are frozen, so that sleet in which the water to snow ratio is 50% to 50% is obtained. However, in a case of a second temperature (for example, the test chamber temperature is −5° C.) higher than the first temperature, water particles injected from the second nozzle 14 could partially remain as water without being frozen. In this case, in the test chamber 1, in addition to water particles injected from the first nozzle 13, the water particles injected from the second nozzle 14 partially turn into rain. Therefore, even if the flow rate ratio between the nozzles 13 and 14 is set to 50% to 50%, sleet having a relatively large water ratio could be obtained (for example, the water to snow ratio is 60% to 40%). Therefore, in the case of the second temperature higher than the first temperature, the flow rate ratio of the second nozzle 14 is made relatively higher than in the case of the first temperature. This prevents a decrease in the snow ratio, and desired sleet (the water to snow ratio is 50% to 50%) can be obtained. That is, the flow rate ratio between the first nozzle 13 and the second nozzle 14 may be regulated based on the state of snow formed by the water particles injected from the second nozzle 14 (for example, information about how much water particles turn into snow among the water particles injected from the second nozzle 14). In this case, the flow rate ratio setting section 40e may regulate the flow rate ratio between the first nozzle 13 and the second nozzle 14 based on the snow state set in the state selection section 40c and the information stored in the related information storage section 40h. Here, the information stored in the related information storage section 40h means information indicating the relationship between the temperature in the test chamber 1 and the snow state depending on water particles from the second nozzle 14.

On the other hand, in a case where the temperature is the second temperature (for example, −30° C.) lower than the first temperature (for example, the test chamber temperature is −15° C.), all the water particles injected from the second nozzle 14 turn into snow, and the water particles injected from the first nozzle 13 partially freeze to turn into snow. That is, only the water particles from the first nozzle 13 generate sleet. For this reason, in a case where the flow rate ratio between both the nozzles 13 and 14 is set to 50% to 50%, the ratio of snow increases with respect to a predetermined degree of sleet (the water to snow ratio is 50% to 50%). Therefore, in the case of the second temperature lower than the first temperature, the flow rate ratio of the second nozzle 14 is made relatively lower than in the case of the first temperature. This prevents an increase in the snow ratio, and a desired degree of sleet (the water to snow ratio is 50% to 50%) can be obtained. That is, the flow rate ratio between the first nozzle 13 and the second nozzle 14 may be regulated based on the state of snow formed by the water particles injected from the first nozzle 13. In this case, the flow rate ratio setting section 40e may regulate the flow rate ratio between the first nozzle 13 and the second nozzle 14 based on the snow state set in the state selection section 40c and the information stored in the related information storage section 40h. Here, the information stored in the related information storage section 40h means information indicating the relationship between the temperature in the test chamber 1 and the state of snow formed by the water particles from the first nozzle 13 (for example, information about how much water particles among the water particles injected from the first nozzle 13 turn into snow).

Instead of or in addition to the method for regulating the flow rate ratio between the first nozzle 13 and the second nozzle 14 to regulate the degree of sleet, the fine adjustment of the degree of sleet may be performed by regulating at least one of the temperature of water to be supplied by the water supply section 18, the pressure of air to be supplied to the second nozzle 14, and the temperature of air to be supplied to the second nozzle 14, based on the information stored in the related information storage section 40h. In this case, first, the temperature of water to be supplied by the water supply section 18, the pressure of air to be supplied to the second nozzle 14, and the temperature of air to be supplied to the second nozzle 14 are regulated by using the information stored in the related information storage section 40h so that all the water particles from the first nozzle 13 turn into rain and all the water particles from the second nozzle 14 turn into snow. At this time, a relationship of the flow rate ratio between first nozzle 13 and second nozzle 14=the degree of sleet (the rain to snow ratio) is established. Then, when the degree of sleet in this state is desired to be finely regulated, for example, when fine regulation is desired to be performed to increase the ratio of snow to the sleet, at least one of reducing the supply water temperature, raising the supply air pressure, and reducing the supply air temperature is performed. On the other hand, when fine regulation is performed to reduce the ratio of snow to sleet, at least one of raising the temperature of supply water, decreasing the pressure of supply air, and raising the temperature of supply air is performed. Thus, the degree of sleet can be finely regulated.

Further, the flow rate control section 40f may correct the flow rate ratio between water to be supplied to the first nozzle 13 and water to be supplied to the second nozzle 14 set by the flow rate ratio setting section 40e using the information stored in the related information storage section 40h. That is, as described above, in a case where sleet is set in the state selection section 40c, the flow rate ratio setting section 40e sets the flow rate ratio between water to the first nozzle 13 and water to the second nozzle 14 to 50% to 50%. In this case, in a case where the degree of sleet is finely regulated, the flow rate ratio set by the flow rate ratio setting section 40e may be corrected by using the information stored in the related information storage section 40h.

As described above, in the present embodiment, under the temperature environment regulated to the temperature set by the air conditioner 12, water is supplied to the first nozzle 13 and the second nozzle 14 at the ratio regulated by the first flow rate regulation valve 28 and the second flow rate regulation valve 30, and water particles are injected from the first nozzle 13 and the second nozzle 14. At this time, since water particles injected from the first nozzle 13 is different in size from water particles injected from the second nozzle 14, regulation of the ratio between quantities of water to be supplied to the first nozzle 13 and the second nozzle 14 makes it possible to obtain the snow environment in the snow state selected by the state selection section 40c among the snow environments where at least one of sleet and snow is caused to fall. That is, the ratio between the quantities of water to be supplied to the first nozzle 13 and the second nozzle 14 is regulated by the first flow rate regulation valve 28 and the second flow rate regulation valve 30, thereby making it possible to create a snow environment not only in a snow state determined depending on the set temperature but also in a desired snow state different from the above state.

Further, in the present embodiment, the ratio between the quantities of water to be supplied to the first nozzle 13 and the second nozzle 14 is regulated while the total flow rate of water to be supplied to the first nozzle 13 and the second nozzle 14 is kept constant, and a desired snow environment is created under the condition that the total flow rate of water to be supplied to the first nozzle 13 and the second nozzle 14 is constant. This makes it possible to easily cope with a case where reproducibility is desired to be checked, and the like. In addition, this is effective for a test in which an actual weather environment where snowfall does not change is reproduced.

Note that the present embodiment has described the case where the first to third tests are performed, but the present invention is not limited to the configuration where the three tests are set to be performed. Only one snow environment may be created, or a plurality of snow environments may be sequentially created.

OTHER EMBODIMENTS

It should be considered that the embodiment disclosed herein is illustrative in all respects and is not restrictive. The present invention is not limited to the above-described embodiment, and various modifications, improvements, and the like can be made without departing from the gist of the present invention. For example, in the above embodiment, the water supply section 18 is configured to supply a constant flow rate of water to the first nozzle 13 and the second nozzle 14 in any of the first test to the third test, but the present invention is not limited thereto. The water supply section 18 may be configured to be able to change the supply flow rate of water. In this way, snowfall can be increased. In this case, the pressure determination section 40k preferably determines the pressure of air to be supplied to the second nozzle 14 so that the pressure becomes higher as the total flow rate of water to be supplied to the first nozzle 13 and the second nozzle 14 is higher under a condition where the temperature of water to be supplied by the water supply section 18 is constant. As a result, in a case where sleet is selected, the snowfall can be increased while the sleet environment is maintained.

In the above embodiment, the first nozzle 13 and the second nozzle 14 are provided, but in addition to them, a third nozzle may be provided. The third nozzle is configured to inject water particles having a larger size than the first nozzle 13, inject water particles having a smaller size than the second nozzle 14, or inject water particles having a size intermediate between the sizes of the water particles from the first nozzle 13 and from the second nozzle 14.

In the above embodiment, the first nozzle 13 is configured by the single-fluid nozzle, and the second nozzle 14 is configured by the two-fluid nozzle, but the present invention is not limited thereto. For example, both the first nozzle 13 and the second nozzle 14 may be configured by two-fluid nozzles, and may be configured such that water particles injected from the first nozzle 13 is larger in size than water particles injected by the second nozzle 14. In this case, the air supply section 16 is configured to also supply air to the first nozzle 13.

In the above embodiment, the controller 40 functions as the flow rate ratio setting section 40e, and is configured to set the ratio of how to distribute the total flow rate of water by the water supply section 18 to the first nozzle 13 and the second nozzle 14, but the present invention is not limited to this configuration. The flow rate ratio setting section 40e may set an absolute value of the flow rate for the first nozzle 13 and an absolute value of the flow rate for the second nozzle 14. Even in this case, the flow rates of water to the first nozzle 13 and the second nozzle 14 are set such that the total flow rate of water to be supplied to the first nozzle 13 and the second nozzle 14 become the flow rate set by the water flow rate setting section 40d.

Figure 8:
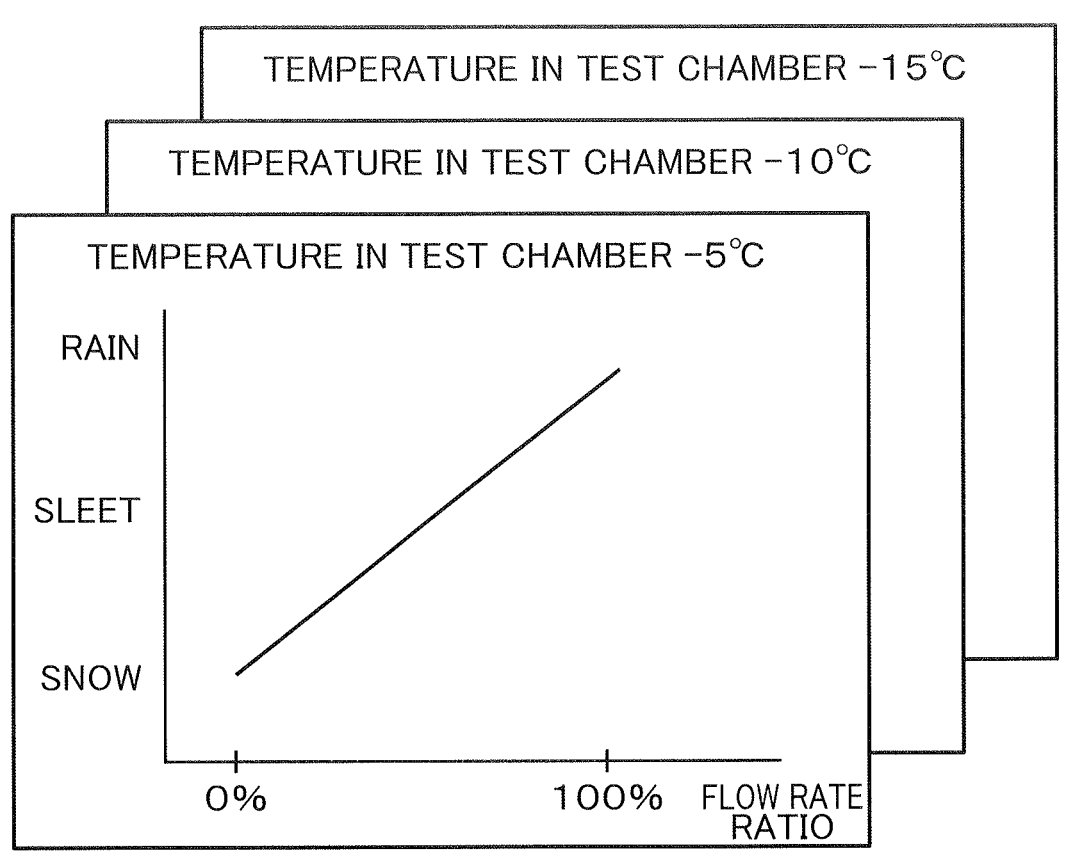
FIG. 8 is a diagram for describing information stored in a related information storage section according to another embodiment.

In the above embodiment, the test temperature (temperature in the test chamber 1), the flow rate of water to be supplied to the second nozzle 14, and the snow state are related with each other in the map 43 included in the related information storage section 40h, but the present invention is not limited to this configuration. Instead of the flow rate of water to be supplied to the second nozzle 14, the flow rate ratio between the first nozzle 13 and the second nozzle 14 may be used. In this case, as illustrated in FIG. 8, instead of the water flow rate, the flow rate ratio that is a flow rate ratio of water to be supplied to the second nozzle 14 to the total water flow rate may be used as a horizontal axis. In this case, the information included in the related information storage section 40h also includes information about the total flow rate of water to be supplied to the first nozzle 13 and the second nozzle 14.

In the above embodiment, the controller 40 also functions as the pressure determination section 40k and the pressure control section 40m, but the present invention is not limited thereto. For example, if the snow quality (dry snow or wet snow) is not selected, the controller 40 does not have to function as the pressure determination section 40k and the pressure control section 40m, and it is sufficient to regulate the ratio between the quantities of water to be supplied to the first nozzle 13 and the second nozzle 14 with the flow rate ratio setting section 40e and the flow rate control section 40f.

Figure 9:
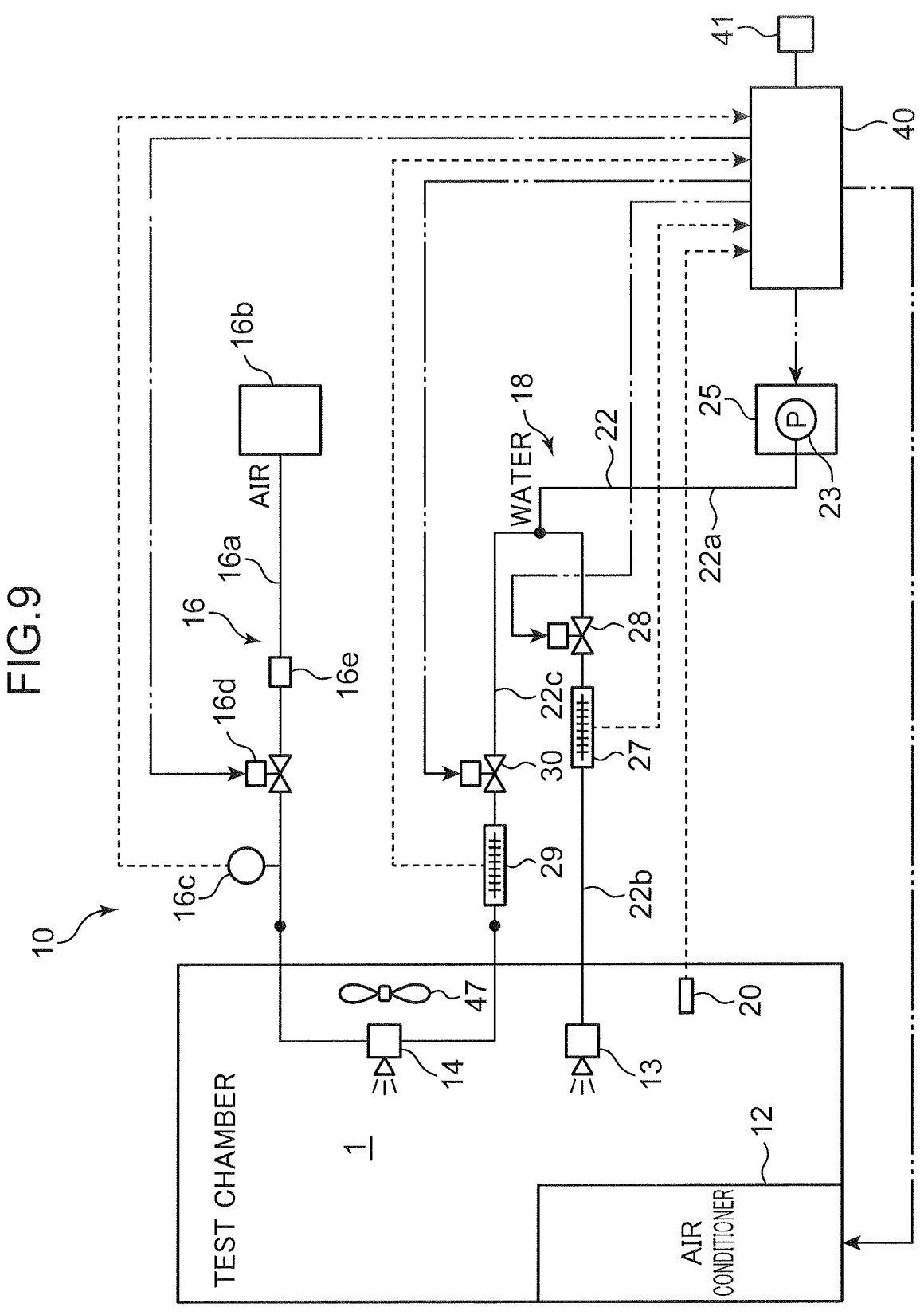
FIG. 9 is a diagram schematically illustrating a snow environment test apparatus according to another embodiment.

As illustrated in FIG. 9, the snow environment test apparatus 10 may include a blower 47 for generating an airflow in the test chamber 1. The airflow generated by the blower 47 can change the time until snow formed by water particles from the second nozzle 14 reaches a specimen. The rotation speed of the blower 47 may be increased or decreased based on a signal input through the input device 41.

Here, the above-described embodiments will be outlined.
(1) A snow environment test apparatus according to the embodiment that creates a snow environment in a test chamber includes a first nozzle configured to inject water particles, a second nozzle configured to inject water particles smaller in size than the water particles from the first nozzle, an air conditioner for regulating a temperature in the test chamber to a set temperature, a state selection section for setting a state of snow to be caused to fall, and a flow rate regulation section for regulating a ratio between quantities of water to be supplied to the first nozzle and the second nozzle for obtaining the state of the snow set in the state selection section at the set temperature as a temperature at which a snow environment is obtained.

In the snow environment test apparatus, under the temperature environment regulated to the set temperature by the air conditioner, water is supplied to the first nozzle and the second nozzle at the ratio regulated by the flow rate regulation section, and water particles are injected from the first nozzle and the second nozzle. At this time, since the water particles injected from the first nozzle are different in size from the water particles injected from the second nozzle, mainly rain is created from the water particles from the first nozzle, and mainly snow is created from the water particles from the second nozzle. The regulation of the ratio between quantities of water to be supplied to the first nozzle and the second nozzle makes it possible to obtain the snow environment in the snow state selected in the state selection section among the snow environments where at least one of sleet and snow is caused to fall. That is, the ratio between the quantities of water to be supplied to the first nozzle and the second nozzle is regulated by the flow rate regulation section, thereby making it possible to create a snow environment not only in the snow state determined depending on the set temperature but also in a desired snow state different from the above state. Note that water may not be supplied to one of the first nozzle and the second nozzle depending on the set snow state.

(2) The flow rate regulation section may be configured to regulate the ratio between the quantities of the water to be supplied to the first nozzle and the second nozzle while a total flow rate of the water to be supplied to the first nozzle and the second nozzle is kept constant.

In this aspect, a desired snow environment is created under the condition that the total flow rate of water to be supplied to the first nozzle and the second nozzle is kept constant. This makes it possible to easily cope with a case where reproducibility is desired to be checked, and the like. In addition, this is effective for a test in which an actual weather environment where snowfall does not change is reproduced.

(3) The flow rate regulation section may be configured to regulate the ratio between the quantities of the water to be supplied to the first nozzle and the second nozzle so that the quantity ratio of the water to be supplied to the first nozzle is greater at a second temperature than at a first temperature, the first temperature and the second temperature being the set temperature and the second temperature being lower than the first temperature.

In this aspect, the quantity of the water to be supplied to the first nozzle is greater at the second temperature as the test chamber temperature than at the first temperature as the test chamber temperature, the second temperature being lower than the first temperature. Thus, more water particles having a larger size are supplied into the test chamber. Therefore, not only snow but also sleet can be easily obtained at the second temperature at which the temperature is lower and snow is likely to be generated.

(4) The flow rate regulation section may be configured to regulate the ratio between the quantities of the water to be supplied to the first nozzle and the second nozzle so that the quantity ratio of the water to be supplied to the second nozzle is greater at a second temperature than at a first temperature, the first temperature and the second temperature being the set temperature and the second temperature being higher than the first temperature.

In this aspect, the quantity of the water to be supplied to the second nozzle is greater at the second temperature as the test chamber temperature than at the first temperature as the test chamber temperature, the second temperature being higher than the first temperature. Thus, more water particles having a smaller size are supplied into the test chamber.

Therefore, snow can be easily obtained at the second temperature at which the temperature is higher and snow is not likely to be generated.

(5) At least the second nozzle may be configured by a two-fluid nozzle, and in this case, the snow environment test apparatus may further include a pressure regulation section for regulating a pressure of air to be supplied to the second nozzle for creation of a snow environment where sleet is caused to fall in a case where the sleet is set as the snow state by the state selection section, the sleet including snow and rain.

In this aspect, the pressure regulation section regulates the pressure of the air to be supplied to the second nozzle, thereby making it possible to create the sleet environment where snow and rain coexist at the set temperature.

(6) At least the second nozzle may be configured by a two-fluid nozzle, and in this case, the snow environment test apparatus may further include a pressure regulation section for regulating a pressure of air to be supplied to the second nozzle. The pressure regulation section may be configured to make the pressure of the air to be supplied to the second nozzle higher as the total flow rate of the water to be supplied to the first nozzle and the second nozzle is greater in a case where sleet including snow and rain is set as the state of snow by the state selection section.

In this aspect, the total flow rate of the water to be supplied to the first nozzle and the second nozzle can be raised to increase snowfall. Moreover, the snowfall can be increased by raising the pressure of the air to be supplied to the second nozzle while the sleet environment is maintained. Further, the pressure regulation section regulates the pressure of the air so that the water particles injected from the second nozzle completely turn into snow. This makes it possible to regulate the quality of sleet (that is, the ratio between snow and rain) more accurately.

(7) At least the second nozzle may be configured by a two-fluid nozzle, and in this case, the snow environment test apparatus may further include a pressure regulation section for regulating a pressure of air to be supplied to the second nozzle for a change in quality of snow. In this aspect, since the pressure regulation section regulates the pressure of the air to be supplied to the second nozzle configured by the two-fluid nozzle, the size of the water particles injected from the second nozzle changes, thus changing the quality of the snow created as snow environment. Note that one mode of the quality of snow includes dry snow and wet snow.

(8) A snow environment test method according to the embodiment for creating a snow environment in a test chamber includes setting a temperature in the test chamber, setting in a state selection section a state of snow to be caused to fall, setting a ratio between quantities of water to be supplied to the first nozzle and the second nozzle to obtain the state of the snow set at the set temperature as a temperature at which the snow environment is obtained, regulating a temperature in the test chamber to the set temperature by an air conditioner, and supplying water to the first nozzle and the second nozzle at the set ratio and injecting water particles from the first nozzle and from the second nozzle, to create the snow environment, the water particles from the second nozzle being smaller in size than the water particles from the first nozzle.

(9) In the snow environment test method, a total flow rate of the water to be supplied to the first nozzle and the second nozzle may be constant.

(10) In the snow environment test method, the ratio between the quantities of the water to be supplied to the first nozzle and the second nozzle may be set so that the quantity ratio of the water to be supplied to the first nozzle is greater at a second temperature as the set temperature than at a first temperature as the set temperature, the second temperature being lower than the first temperature.

(11) In the snow environment test method, the ratio between the quantities of the water to be supplied to the first nozzle and the second nozzle may be set so that the quantity ratio of the water to be supplied to the second nozzle is greater at a second temperature as the set temperature than at a first temperature as the set temperature, the second temperature being higher than the first temperature.

As described above, not only a snow environment determined depending on a temperature condition but also a snow environment in a desired snow state can be created.

This application is based on Japanese Patent application No. 2022-137109 filed in Japan Patent Office on Aug. 30, 2022, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A snow environment test apparatus for creating a snow environment in a test chamber, the apparatus comprising:
a first nozzle configured to inject water particles;
a second nozzle configured to inject water particles smaller in size than the water particles from the first nozzle;
an air conditioner for regulating a temperature in the test chamber to a set temperature;
a controller comprising a computer; and
an input device operatively connected to the controller;
wherein the controller includes a state selector configured to set, based on an input by a user via the input device, a degree of sleet based on a ratio between rain and snow as a state of snow to be caused to fall or configured to set, based on an input by the user via the input device, one out of snow, sleet, and rain as a state of snow to be caused to fall; and
wherein the snow environment test apparatus further comprises a flow rate regulator configured to regulate a ratio between quantity of water to be supplied to the first nozzle and quantity of water to be supplied to the second nozzle for obtaining the state of the snow set in the state selector at the set temperature as a temperature at which a snow environment is obtained.

2. The snow environment test apparatus according to claim 1, wherein the flow rate regulator is configured to regulate the ratio between the quantity of the water to be supplied to the first nozzle and the quantity of water to be supplied to the second nozzle while a total flow rate of the water to be supplied to the first nozzle and the second nozzle is kept constant.

3. The snow environment test apparatus according to claim 1, wherein the flow rate regulator is configured to regulate the ratio between the quantity of the water to be supplied to the first nozzle and the quantity of water to be supplied to the second nozzle so that the quantity ratio of the water to be supplied to the first nozzle is greater in a case of the set temperature being a second temperature than in a case of the set temperature being a first temperature, the second temperature being lower than the first temperature.

4. The snow environment test apparatus according to claim 1, wherein the flow rate regulator is configured to regulate the ratio between the quantity of the water to be supplied to the first nozzle and the quantity of water to be supplied to the second nozzle so that the quantity ratio of the water to be supplied to the second nozzle is greater in a case of the set temperature being a second temperature than in a case of the set temperature being a first temperature, the second temperature being higher than the first temperature.

5. The snow environment test apparatus according to claim 1,
wherein at least the second nozzle is configured by a two-fluid nozzle, the apparatus further comprising:
a pressure regulator configured to regulate a pressure of air to be supplied to the second nozzle for creation of a snow environment where sleet is caused to fall in a case where the sleet is set as the snow state by the state selector, the sleet including snow and rain.

6. The snow environment test apparatus according to claim 1,
wherein at least the second nozzle is configured by a two-fluid nozzle, the apparatus further comprising:
a pressure regulator configured to regulate a pressure of air to be supplied to the second nozzle,
wherein the pressure regulator is configured to make the pressure of the air to be supplied to the second nozzle higher as the total flow rate of the water to be supplied to the first nozzle and the second nozzle is greater in a case where sleet including snow and rain is set as the state of snow by the state selector.

7. The snow environment test apparatus according to claim 1,
wherein at least the second nozzle is configured by a two-fluid nozzle, the apparatus further comprising:
a pressure regulator configured to regulate a pressure of air to be supplied to the second nozzle for a change in quality of snow to be caused to fall.

8. A snow environment test method for creating a snow environment in a test chamber, the method comprising:
a user setting a temperature in the test chamber;
a user setting a degree of sleet based on a ratio between rain and snow as a state of snow to be caused to fall, or setting one out of snow, sleet, and rain as a state of snow to be caused to fall;
setting a ratio between a quantity of water to be supplied to a first nozzle and a quantity of water to be supplied to a second nozzle to obtain the state of the snow set at the set temperature in the test chamber;
regulating a temperature in the test chamber to the set temperature by an air conditioner;
supplying water to the first nozzle and the second nozzle at the set ratio; and
injecting water from the first nozzle and from the second nozzle to create the snow environment, the water from the second nozzle including water particles smaller in size than water particles included in the water from the first nozzle.

9. The snow environment test method according to claim 8, wherein a total flow rate of the water to be supplied to the first nozzle and the second nozzle is constant.

10. The snow environment test method according to claim 8, wherein the ratio between the quantity of the water to be supplied to the first nozzle and the quantity of water to be supplied to the second nozzle is set so that the quantity ratio of the water to be supplied to the first nozzle is greater in a case of the set temperature being a second temperature than in a case of the set temperature being a first temperature, the second temperature being lower than the first temperature.

11. The snow environment test method according to claim 8, wherein the ratio between the quantity of the water to be supplied to the first nozzle and the quantity of water to be supplied to the second nozzle is set so that the quantity ratio of the water to be supplied to the second nozzle is greater in a case of the set temperature being a second temperature than in a case of the set temperature being a first temperature, the second temperature being higher than the first temperature.

\* \* \* \* \*